United States Patent
Kurz et al.

(10) Patent No.: US 8,739,824 B2
(45) Date of Patent: Jun. 3, 2014

(54) MAGNET VALVE AND DRIVER ASSISTANCE SYSTEM

(75) Inventors: Edgar Kurz, Heilbronn-Horkheim (DE); Dietmar Kratzer, Tamm (DE)

(73) Assignee: Robert Bosch GmbH, Stuttgart (DE)

(*) Notice: Subject to any disclaimer, the term of this patent is extended or adjusted under 35 U.S.C. 154(b) by 478 days.

(21) Appl. No.: 12/976,389

(22) Filed: Dec. 22, 2010

(65) Prior Publication Data

US 2011/0147626 A1  Jun. 23, 2011

(30) Foreign Application Priority Data

Dec. 23, 2009 (DE) .................. 10 2009 060 297

(51) Int. Cl.
*F16K 11/20* (2006.01)

(52) U.S. Cl.
USPC ............. 137/597; 251/129.02; 251/129.15; 251/362

(58) Field of Classification Search
CPC . F16K 19/00; F16K 31/0655; F16K 31/0658; F16K 27/029; B60T 8/3615
USPC ............. 251/129.02, 129.15, 359, 360, 362; 137/597
See application file for complete search history.

(56) References Cited

U.S. PATENT DOCUMENTS

| | | | |
|---|---|---|---|
| 3,023,777 A * | 3/1962 | Collins | 251/129.02 |
| 5,076,326 A * | 12/1991 | McCabe | 137/625.65 |
| 6,748,976 B2 * | 6/2004 | Sato et al. | 137/625.65 |
| 6,994,406 B1 * | 2/2006 | Krawczyk et al. | 303/119.2 |
| 7,273,206 B2 * | 9/2007 | Sato et al. | 251/129.15 |
| 7,396,090 B2 * | 7/2008 | Krawczyk et al. | 303/119.2 |
| 8,221,100 B2 * | 7/2012 | Forrest et al. | 417/567 |
| 2006/0043326 A1 * | 3/2006 | Linkner et al. | 251/129.15 |
| 2009/0278067 A1 * | 11/2009 | Voss | 251/129.15 |

FOREIGN PATENT DOCUMENTS

| | | |
|---|---|---|
| CN | 2230690 Y | 7/1996 |
| KR | 10-20040040807 | 5/2004 |

* cited by examiner

*Primary Examiner* — John K Fristoe, Jr.
*Assistant Examiner* — Jessica Cahill
(74) *Attorney, Agent, or Firm* — Maginot, Moore & Beck

(57) ABSTRACT

The invention relates to a magnet valve having a valve body, in which at least one inlet conduit and/or at least one outlet conduit of the magnet valve is provided in at least some regions in the valve body. The inlet conduit and/or outlet conduit are in fluidic communication with a valve seat of the magnet valve. According to the invention in the valve body, a receptacle region is provided, in which an insert part having or embodying the inlet conduit and/or the outlet conduit in at least some regions is disposed. The invention further relates to a driver assistance system having such a magnet valve.

21 Claims, 1 Drawing Sheet

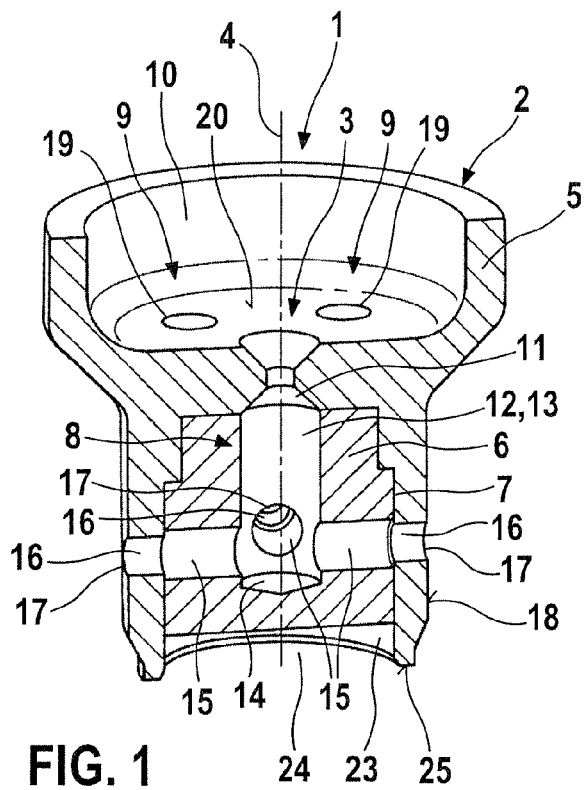
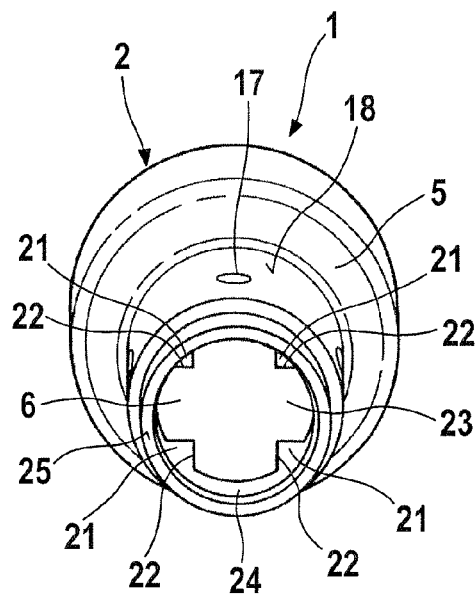
FIG. 1
FIG. 2
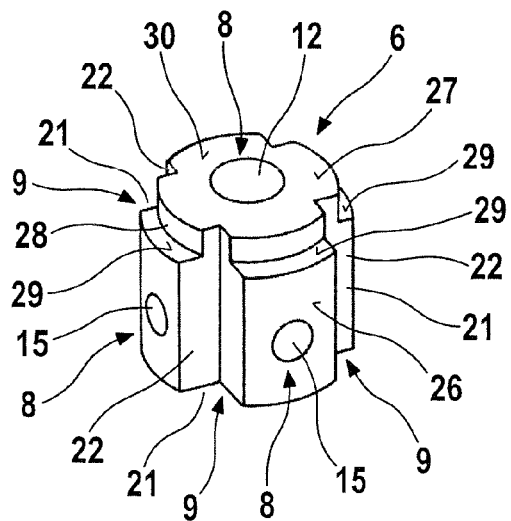
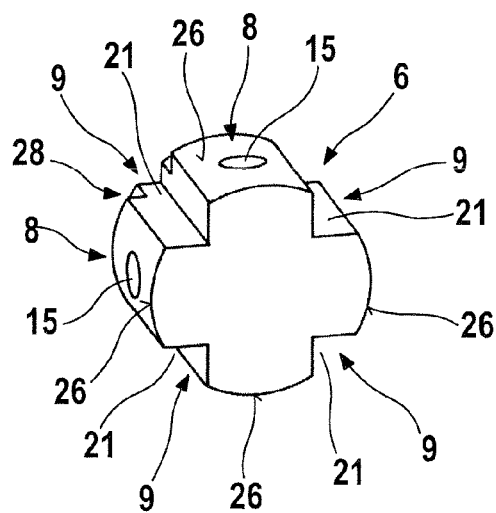
FIG. 3
FIG. 4

MAGNET VALVE AND DRIVER ASSISTANCE SYSTEM

CROSS-REFERENCE TO RELATED APPLICATION

This application is based on German Patent Application 10 2009 060 297.6 filed on Dec. 23, 2009.

BACKGROUND OF THE INVENTION

1. Field of the Invention

The invention relates to a magnet valve having a valve body, in which at least one inlet conduit and/or at least one outlet conduit of the magnet valve is provided in at least some regions in the valve body, and the inlet conduit and/or outlet conduit are in fluidic communication with a valve seat of the magnet valve. The invention also relates to a driver assistance system.

2. Description of the Prior Art

Magnet valves of the type defined at the outset are known from the prior art. Such magnet valves are embodied for instance as continuously adjustable magnet valves that are closed when without current. Alternatively, magnet valves that are open when without current are feasible. The magnet valves are often those with a radial oncoming flow and an axial outflow. This means that at least one fluid inlet port of the magnet valve is embodied on its jacket face, while at least one fluid outlet port is located on an end face. Often, the fluid inlet port and the fluid outlet port are provided—viewed in the axial direction of the magnet valve, on the same side of the valve seat of the magnet valve, on the valve body or the magnet valve. Often, the inlet conduit in particular is embodied in the valve body. For producing the inlet conduit, in the magnet valve with an axial oncoming flow, an axial bore is typically embodied as far as the valve seat, beginning on the face end of the valve body or of the magnet valve. Downstream, at least one radial inlet recess is embodied, which extends in the radial direction and establishes fluidic communication from the fluid inlet port, located on the jacket face, to the inlet conduit. Next, the region of the inlet conduit that faces away from the valve seat is sealed off below the radial inlet recess by means of a sealing element, for instance by press-fitting in a ball. This procedure is complicated and expensive, especially because at least a region of the valve seat has to be embodied on the end of a comparatively long bore. In addition or alternatively, the outlet conduit can be located in the valve body as well. If an axial outflow of the magnet valve is implemented, that is, if the fluid outlet port corresponding to the outlet conduit is located on the end face of the magnet valve or valve body, then the at least one outlet conduit must extend through the valve body over at least a portion of its longitudinal length. This means that the outlet conduit has a very great depth in proportion to its diameter. For example, the diameter of the outlet conduit is said to be 1.2 mm and the depth is said to be 5.5 mm. The result is a ratio of diameter to depth of 1.2 mm/5.5 mm=0.22. Often, the outlet conduit is embodied as a bore. Producing a bore with this kind of ratio of diameter to depth, however, is problematic.

ADVANTAGES AND SUMMARY OF THE INVENTION

By comparison, the magnet valve has the advantage that it is simpler and less expensive to produce, and in particular, the sealing element used for closing the inlet conduit is dispensed with, and the ratio of diameter to depth of the outlet conduit is reduced. This is attained in accordance with the invention in that a receptacle region is provided in the valve body, and an insert part having or embodying the inlet conduit and/or the outlet conduit in at least some regions is disposed in the receptacle region. The insert part, after being into the receptacle region, is associated with the valve body. The valve body in particular has a base body, in which the receptacle region is embodied, and also has the insert part. In at least some regions the insert part contains or embodies the inlet conduit, the outlet conduit, or both. This last can be provided together with the base body of the valve body. In addition, the base body can have one region each of the inlet conduit and/or the outlet conduit. Thus regions of the inlet conduit and the outlet conduit can be distributed to the base body and the insert part. In this way, the depth of bores required for producing the outlet conduit and the inlet conduit can be reduced, and thus the ratio of diameter to depth can be increased. It can also be provided that the valve seat is located or embodied on the base body, while the insert part has or embodies at least one further region of the inlet conduit. In this way, the embodiment of the valve seat is simplified, since it is no longer located on the end of a comparatively deep bore. Moreover, the use of the sealing element is dispensed with, since after the insertion of the insert part into the receptacle region, the inlet conduit is preferably already complete. The valve seat is located in the base body of the valve body, not in or on the insert part.

A refinement of the invention provides that the insert part has a central axial inlet recess, which in at least some regions embodies the inlet conduit and adjoins a supply opening associated with the valve seat. The valve seat and the supply opening are embodied in the base body of the valve body. The supply opening also forms a region of the inlet conduit. This supply opening is adjoined by the axial inlet recess, which is provided centrally in the insert part and also embodied one region of the inlet conduit. Depending on whether the magnet valve is embodied for radial oncoming flow and an axial outflow, or an axial oncoming flow and a radial outflow, the axial inlet recess can be embodied variously. To implement an axial oncoming flow, the axial inlet recess can for instance be embodied continuously in the insert part or in other words can extend all the way through the insert part in the axial direction.

A further refinement of the invention provides that the axial inlet recess is a blind recess and is in fluidic communication with at least one radial inlet recess, discharging into a jacket face of the insert part, which recess forms a further region of the inlet conduit. Thus not only the axial inlet recess but also the at least one radial inlet recess is provided in the insert part. The axial inlet recess extends in the axial direction and the radial inlet recess extends at least essentially in the radial direction. Alternatively, however, an oblique course of the radial inlet recess may be present; that is, the direction of the radial inlet recess must merely have a radial component. The radial inlet recess forms a further region of the inlet conduit and is in fluidic communication with the axial outlet recess. The radial inlet recess discharges into the jacket face of the insert part, or in other words beginning at the axial inlet recess disposed centrally in the insert part, it extends radially outward to the jacket face. The axial inlet recess is embodied as a blind bore. Advantageously, the radial inlet recess discharges into the axial inlet recess in the vicinity of a bottom of the blind recess. However, it may also be spaced apart from the bottom in the axial direction.

A further refinement of the invention provides that the radial inlet recess corresponds to a through opening, which is provided in a wall of a base body of the valve body and which has a fluid inlet port. Thus the insert part is disposed in the receptacle region in such a way that the radial inlet recess is in fluidic communication with the through opening. Advantageously, the radial inlet recess has the same dimensions as the through opening, and vice versa. The through opening is embodied in the wall of the base body and accordingly establishes a communication with the fluid inlet port of the magnet valve. Via this fluid inlet port, the fluid, which can flow through the through opening, the radial inlet recess and the axial inlet recess as far as the supply opening or the valve seat, can be supplied to the magnet valve, especially when the valve seat is opened by a sealing element. The axial inlet recess in this respect forms a kind of riser conduit of the magnet valve.

A further refinement of the invention provides that the insert part has at least one axial outlet recess, which corresponds to an outlet opening of a fluid chamber, and the axial outlet recess and outlet opening each form one region of the outlet conduit. The axial outlet recess of the insert part need not form the region of the outlet conduit all by itself. Instead, it can be provided that in the vicinity of the axial outlet recess, the insert part embodies the region of the outlet conduit together with other regions of the valve body, especially the base body. Thus the axial outlet recess need not be in the form of a closed conduit in the insert part. The axial outlet recess corresponds with the outlet opening and accordingly is in fluidic communication with it. The outlet opening is embodied for instance in the base body and in turn is in fluidic communication with the fluid chamber. The fluid chamber is embodied by the valve body. The valve seat is provided in the vicinity of the fluid chamber, for instance. The axial outlet recess and the outlet opening each serve as one region of the outlet conduit. By way of them, a fluidic communication is embodied, especially beginning at the fluid chamber, to a fluid outlet port of the magnet valve. Advantageously, there are as many outlet openings as there are axial outlet recesses, and each of the outlet openings corresponds with one of the axial outlet recesses. Advantageously, both the outlet opening and the axial outlet recess extend in the axial direction of the insert part or magnet valve. In this way, an outflow from the magnet valve in the axial direction can be implemented. Also in this way, the requirement that the outlet conduit be produced as an elongated bore with an unfavorable diameter-to-depth ratio is avoided. Instead, the outlet conduit is subdivided into a plurality of regions, and at least one region is formed by the axial outlet recess, and one further region is formed by the outlet opening.

A further refinement of the invention provides that the axial outlet recess is embodied by an at least regionally embodied setback on the insert part and/or the base body. In longitudinal section (that is, a section in the axial direction of the magnet valve), the setback can have an arbitrary shape. For instance, it can have a triangular recess that is open at the edge. Alternatively, the axial outlet recess is embodied as a bore in the insert part. Especially if the axial outlet recess is open on the edge, it is formed by the setback of the insert part or of the base body. This means that it is located between an inner wall of the base body and an outer wall of the insert part, and the inner wall and the outer wall, in at least some regions, are spaced apart from one another to form the axial outlet recess.

A further refinement of the invention provides that the insert part has a base for securing to the base body. The base serves to absorb axial forces, or to introduce axial forces that act on the insert part into the base body of the valve body. The base may for instance be in cylindrical form and located on its entire circumference on the insert part. Advantageously, however, the base is not continuous in the circumferential direction but rather has protrusions and/or setbacks, which are provided for orienting the insert part, especially in the circumferential direction. For instance, one such protrusion or setback can act as an orientation device which cooperates with a contrary orientation element of the base body, to enable a circumferential orientation of the insert part with the base body. As a result of the cooperation of the orientation device and the contrary orientation element, an angular position of the insert part in the base body is thus defined. In this way, reliable cooperation of the radial inlet recess of the insert part with the through opening of the base body and also of the axial outlet recess with the outlet opening can be implemented.

A further refinement of the invention provides that the insert part is secured to the base body in form-locking, force-locking and/or material-locking fashion. Advantageously, however, a force-locking connection is provided, since that is easy and inexpensive to implement. For instance, the insert part can be in the form of a press-fitted part, which in a production of the magnet valve is press-fitted into the receptacle region of the valve body, thus achieving a force-locking connection between the insert part and the base body.

A further refinement of the invention provides that the fluid outlet port of the magnet valve is disposed in the radial direction, and a fluid inlet port of the magnet valve is disposed in the axial direction. This means that the faces of the ports are perpendicular to an imaginary radial straight line, beginning at a longitudinal axis of the magnet valve, or to an imaginary straight line that extends coaxially or parallel to the longitudinal axis. For instance, the fluid inlet port is provided on the jacket face of the magnet valve, and the fluid outlet port is provided on the end face of the magnet valve. It is furthermore advantageous if both the fluid inlet port and the fluid outlet port are located on the valve body or on the magnet valve on the same side—viewed in the axial direction of the magnet valve—as the valve seat. In an alternative embodiment, it can actually also be provided that the fluid inlet port is provided in the axial direction, and the fluid outlet port in the radial direction. In such an embodiment, the fluid inlet port is located on the face end, and the fluid outlet port is located on the jacket face.

The invention further relates to a driver assistance system, in particular an ABS, TC or ESP system, having at least one magnet valve, in particular as described above and having a valve body, in which at least one inlet conduit and/or at least one outlet conduit of the magnet valve is provided in at least some regions in the valve body, and the inlet conduit and/or outlet conduit are in fluidic communication with a valve seat of the magnet valve. In the valve body, a receptacle region is provided, in which an insert part having or embodying the inlet conduit and/or the outlet conduit in at least some regions is disposed. The magnet valves described above are suitable for instance for this kind of driver assistance system. By the embodiment of the insert part, it can be determined in a simple way whether the magnet valve is to be designed for a radial oncoming flow and an axial outflow, or an axial oncoming flow and a radial outflow. Further regions of the magnet valve need not be adapted to this. In the driver assistance system, it can happen that magnet valves with both an axial and a radial oncoming flow and a corresponding outflow are needed. These can be implemented, as described above, by means of a simple replacement of the insert part. To that end, a simple, economical embodiment of the driver assistance system with a comparatively small number of parts is feasible.

BRIEF DESCRIPTION OF THE DRAWINGS

The invention will be better understood and further objects and advantages thereof will become more apparent from the ensuing detailed description of preferred embodiments taken in conjunction with the drawings, in which:

FIG. 1 is a cross section through a region of a magnet valve having a valve body and an insert part inserted into a receptacle region;

FIG. 2 is a view of the valve body from below;

FIG. 3 shows the insert part in a first view; and

FIG. 4 shows the insert part in a further view.

DESCRIPTION OF THE PREFERRED EMBODIMENT

FIG. 1 shows a region of the magnet valve 1, in which only a valve body 2 is shown in which there is a valve seat 3 of the magnet valve 1. Accordingly, above the valve body 2 is a magnet armature, with a sealing element operatively connected to it; the sealing element can be disposed for closing the valve seat 3. To that end, the sealing element can be shifted by means of the magnet armature in the axial direction of the magnet valve 1 (corresponding to a longitudinal axis 4), whereupon in a closing position it cooperates with the valve seat 3 in such a way that a fluidic communication inside the magnet valve 1 is interrupted. Conversely, in an open position, the sealing element is spaced apart from the valve seat 3, so that the fluidic communication is established. The valve body 2 comprises a base body or basic element 5, and an insert part 6; the latter is disposed in a receptacle region 7 of the basic element 5 or of the valve body 2. The insert part 6 is embodied for instance as a press-fitted part and accordingly is press-fitted into the receptacle region 7 during an assembly of the magnet valve 1. In the valve body 2, there are at least one inlet conduit 8 and at least one outlet conduit 9. In the embodiment shown here, four outlet conduits 9 are provided, two of which are shown. Fluid can be supplied to the valve seat 3 through the inlet conduit 8. Through the valve seat 3, the fluid can reach a fluid chamber 10, formed in at least some regions by the valve body 2, when the valve seat 3 is opened by the sealing element. From the fluid chamber 10, the fluid can then flow out of the magnet valve 1 through the outlet conduits 9.

The inlet conduit 8 has a supply opening 11, which is embodied in the basic element 5 and immediately adjoins the valve seat 3. An axial inlet recess 12 is in fluidic communication with the supply opening 11 and is located in the insert part 6 in the form of a blind recess 13. This means that the axial inlet recess 12 does not extend all the way through the insert part 6 in the axial direction; instead, it has a bottom 14 or in other words is closed on the side remote from the valve seat 3. In the vicinity of the bottom 14, four radial inlet recesses 15 extend from the axial inlet recess 12; three of them are shown from the different views in the FIGS. 1-4. These radial inlet recesses 15 form a further region of the inlet conduit 8. The radial inlet recesses 15, which moreover are embodied in the insert part 6, are adjoined each by a respective through opening 16, which is embodied in the basic element 5. Each of these through openings 16 has a fluid inlet port 17. They are embodied on a jacket face 18 of the basic element 5 of the valve body 2 of the magnet valve 1. Through these fluid inlet ports 17, fluid can be supplied to the magnet valve 1 in the radial direction. The magnet valve 1 is designed in this respect for a radial incoming flow. The inlet conduit 8 is consequently embodied in multiple parts, being embodied in some regions in the base body 5 and in some regions in the insert part 6. The insert part 6 is disposed in the receptacle region 7 of the base body 5 in such a way that the radial inlet recesses 15 are aligned with the through openings 16, so that at this point a fluidic communication exists, and fluid which is supplied to the magnet valve 1 through the fluid inlet ports 17 can flow in the direction of the valve seat 3. Just like the inlet conduit 8, the outlet conduits 9 are also embodied in multiple parts. To that end, the basic element 5 has four outlet openings 19, two of which are shown here. The outlet openings 19, just like the valve seat 3, are embodied in a bottom face 20 of the fluid chamber 10 or of the valve body 2.

FIG. 2 shows a view of the magnet valve 1 from below. It can be seen that the insert part 6 has four axial outlet recesses 21. These are embodied by setbacks 22 of the insert part 6 and are essentially triangular in longitudinal section. As a result of the open-edged embodiment of the axial outlet recesses 21, the insert part 6 cooperates with the basic element 5, in order to form the axial outlet recesses 21 and thus to form a further region of the outlet conduits 9. To that end, the axial outlet recesses 21 are disposed such that there is a fluidic communication with the outlet openings 19 in the bottom face 20 of the valve body 2. This means that the outlet openings 19 and the axial outlet recesses 21 each form one region of the outlet conduits 9. The axial outlet recesses 21 discharge into a collection chamber 23, which can also be part of the outlet conduit 9. The collection chamber 23 is adjoined by a fluid outlet port 24 of the magnet valve 1. Accordingly, the magnet valve 1 is designed for an axial outflow, since the fluid outlet port 24 is embodied in an end face 25 of the magnet valve 1.

FIG. 3 shows the insert part 6 by itself, in a first view. The axial inlet recess 12 disposed centrally in the insert part 6 can be seen along with the radial inlet recesses 15 that communicate fluidically with the axial inlet recess 12. As already described above, these each form regions of the inlet conduit 8. The axial outlet recesses 21 formed by setbacks 22 are also shown. It is clear that the radial inlet recesses 15 discharge into a jacket face 26 of the insert part 6, while the axial inlet recesses 12 discharge into an end face 27 of the insert part 6. For being secured in the receptacle region 7, the insert part 6 has a base 28, which is set back relative to the jacket face 26, or in other words has a smaller diameter, for instance. Because of the base 28, there are two support faces 29 and 30 offset from one another axially on the insert part 6. They cooperate with counterpart faces, not shown, of the base body 5 in order to attain an axial bracing of the insert part 6 in the receptacle region 7. Preferably, the insert part 6 is embodied as a press-fit part and is accordingly held in force-locking fashion in the receptacle region 7 of the basic element 5 or of the valve body 2. Upon assembly of the magnet valve 1, it is provided that the insert part 6 is merely press-fitted into the basic element 5.

FIG. 4 shows an alternative view of the insert part 6. It can be seen that the axial inlet recess 12 is in the form of a blind bore, which does not extend all the way through the insert part 6 in the axial direction.

The foregoing relates to a preferred exemplary embodiment of the invention, it being understood that other variants and embodiments thereof are possible within the spirit and scope of the invention, the latter being defined by the appended claims.

We claim:

1. A magnet valve comprising:
   a valve body including a first end portion defining a fluid chamber, a second end portion defining a receptacle region, and a wall portion between the fluid chamber and the receptacle region having a first surface that forms a bottom face of the fluid chamber and a second surface that forms an inner end of the receptacle region, the wall portion including a valve seat formed in the bottom face of the fluid chamber, a supply opening formed in the inner end of the receptacle region, and a fluid conduit that fluidly connects the valve seat and supply opening, the second end portion including at least one fluid port that is fluidly connected to the receptacle region, and an insert part received in the receptacle region, the insert part including a fluid conduit that fluidly connects the at least one fluid port to the supply opening.

2. The magnet valve as defined by claim 1, wherein the insert part has at least one axial outlet recess, which is connected to an outlet opening that extends through the wall portion of the valve body to the fluid chamber, and the axial outlet recess and the outlet opening each form one region of an outlet conduit.

3. The magnet valve as defined by claim 2, wherein the axial outlet recess is embodied by an at least regionally embodied setback on an outer surface of the insert part and/or an inner surface of the valve body.

4. The magnet valve as defined by claim 1, wherein the second end portion of the valve body includes at least one inlet port, wherein the fluid conduit in the insert part fluidly connects the at least one inlet port to the supply opening, and wherein the insert part has a central axial inlet recess that forms a portion of the fluid conduit.

5. The magnet valve as defined by claim 4, wherein the axial inlet recess is a blind recess, wherein the at least one inlet port are arranged radially with respect to the receptacle region, and wherein the insert part includes at least one radial inlet recess fluidly connected to the axial inlet recess and that extend through a jacket face of the insert part to the at least one inlet port.

6. The magnet valve as defined by claim 5, wherein each of the radial inlet recesses are fluidly connected to a through opening provided in a wall of the second end portion of the valve body and which lead to a fluid inlet port.

7. The magnet valve as defined by claim 6, wherein the second end portion of the valve body includes at least one axial output port, wherein the wall portion defines at least one outlet opening spaced apart from the valve seat that fluidly connects the fluid chamber to the receptacle region, and wherein the insert part has at least one axial outlet recess that fluidly connects the at least one outlet opening to the at least one outlet port.

8. The magnet valve as defined by claim 7, wherein the insert part includes an inner end portion oriented toward the inner end of the receptacle region and an outer end portion oriented toward the at least one outlet port, wherein each of the axial outlet recesses is embodied by a setback on the insert part and/or the second end portion of the valve body that forms a gap between an outer wall of the insert part and an inner wall of the receptacle region that extends from the inner end portion to the outer end portion of the insert part.

9. The magnet valve as defined by claim 1, wherein the insert part has a central axial inlet recess that embodies the fluid conduit and adjoins the supply opening associated with the valve seat.

10. The magnet valve as defined by claim 9, wherein the insert part has at least one axial outlet recess, which is connected to an outlet opening that extends through the wall portion of the valve body to the fluid chamber, and the axial outlet recess and the outlet opening each form one region of an outlet conduit.

11. The magnet valve as defined by claim 10, wherein the axial outlet recess is embodied by an at least regionally embodied setback on an outer surface of the insert part and/or an inner surface of the valve body.

12. The magnet valve as defined by claim 9, wherein the axial inlet recess is a blind recess and is in fluidic communication with at least one radial inlet recess, the at least one radial inlet recess discharging through a jacket face of the insert part, the at least one radial inlet recess forming a further region of the inlet conduit.

13. The magnet valve as defined by claim 12, wherein the insert part has at least one axial outlet recess, which is connected to an outlet opening that extends through the wall portion of the valve body to the fluid chamber, and the axial outlet recess and the outlet opening each form one region of an outlet conduit.

14. The magnet valve as defined by claim 13, wherein the axial outlet recess is embodied by an at least regionally embodied setback on an outer surface of the insert part and/or an inner surface of the valve body.

15. The magnet valve as defined by claim 12, wherein the at least one radial inlet recess is connected to through opening provided in an outer wall of the valve body and which has a fluid inlet port.

16. The magnet valve as defined by claim 15, wherein a base of the insert part is secured to the valve body using at least one of a form-locking, force-locking and material-locking connection.

17. The magnet valve as defined by claim 15, wherein a base of the insert part is secured to the valve body using at least one of a form-locking, force-locking and material-locking connection.

18. The magnet valve as defined by claim 15, wherein the insert part has at least one axial outlet recess, which is connected to an outlet opening that extends through the wall portion of the valve body to the fluid chamber, and the axial outlet recess and the outlet opening each form one region of an outlet conduit.

19. The magnet valve as defined by claim 18, wherein the axial outlet recess is embodied by an at least regionally embodied setback on an outer surface of the insert part and/or an inner surface of the valve body.

20. The magnet valve as defined by claim 15, wherein the insert part has a base for securing the insert part to the valve body in the receptacle region.

21. The magnet valve as defined by claim 20, wherein a base of the insert part is secured to the valve body using at least one of a form-locking, force-locking and material-locking connection.

* * * * *

UNITED STATES PATENT AND TRADEMARK OFFICE
CERTIFICATE OF CORRECTION

PATENT NO.         : 8,739,824 B2                                       Page 1 of 1
APPLICATION NO.    : 12/976389
DATED              : June 3, 2014
INVENTOR(S)        : Kurz It is certified that error appears in the above-identified patent and that said Letters Patent is hereby corrected as shown below:

In the Claims

In column 8, lines 27-28, Claim 15 should read:

"The magnet valve as defined by claim 12, wherein the at least one radial inlet recess is connected to a through opening"

Signed and Sealed this
Sixth Day of January, 2015

Michelle K. Lee
*Deputy Director of the United States Patent and Trademark Office*